US008010519B2

(12) United States Patent
Hsu et al.

(10) Patent No.: US 8,010,519 B2
(45) Date of Patent: Aug. 30, 2011

(54) METHOD AND SYSTEM FOR MITIGATING IMPACT OF USER ERRORS IN DATA STORES

(75) Inventors: Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 12/182,063

(22) Filed: Jul. 29, 2008

(65) Prior Publication Data

US 2010/0030729 A1 Feb. 4, 2010

(51) Int. Cl.
*G06F 17/30* (2006.01)
*G06F 13/00* (2006.01)
*G06F 13/28* (2006.01)
*G06F 9/46* (2006.01)

(52) U.S. Cl. ........ 707/705; 707/781; 707/821; 711/159; 711/151; 711/112; 711/137; 718/104

(58) Field of Classification Search .................. 707/705, 707/781, 821; 711/159, 151, 112, 137; 718/104
See application file for complete search history.

(56) References Cited

U.S. PATENT DOCUMENTS

| | | | |
|---|---|---|---|
| 6,212,526 B1 * | 4/2001 | Chaudhuri et al. .................. 1/1 |
| 6,339,772 B1 * | 1/2002 | Klein et al. .................. 707/704 |
| 6,442,648 B1 * | 8/2002 | Genduso et al. ............. 711/112 |
| 6,484,239 B1 * | 11/2002 | Hill et al. ...................... 711/137 |
| 6,711,703 B2 | 3/2004 | MacLaren et al. |
| 6,715,116 B2 | 3/2004 | Lester et al. |
| 6,738,973 B1 * | 5/2004 | Rekimoto .................... 718/104 |
| 6,832,340 B2 | 12/2004 | Larson et al. |
| 6,845,472 B2 | 1/2005 | Walker et al. |
| 7,606,983 B2 * | 10/2009 | Locker ........................ 711/151 |
| 7,673,105 B2 * | 3/2010 | Stanfill ........................ 711/159 |
| 2006/0047773 A1 * | 3/2006 | Locker ........................ 709/213 |
| 2006/0150105 A1 | 7/2006 | Bright et al. |
| 2006/0168503 A1 | 7/2006 | Schroeder et al. |
| 2006/0294330 A1 * | 12/2006 | Stanfill ........................ 711/159 |
| 2007/0106849 A1 * | 5/2007 | Moore et al. ................. 711/137 |
| 2007/0168719 A1 | 7/2007 | Masser |
| 2009/0083212 A1 * | 3/2009 | Bhattacharjee et al. .......... 707/1 |
| 2010/0122048 A1 * | 5/2010 | Stanfill ........................ 711/159 |

OTHER PUBLICATIONS

A. Shankar, et al., Building and Supporting a Massive Data Infrastructure for the Masses, Proc. 30th Ann. ACM SIGUCCS on User Services, Nov. 2002, p. 134-138, Providence, RI.
G. Asadi, et al., Soft Error Rate Estimation and Mitigation for SRAMBased FPGAs, Proc. 2005 ACM/SIGDA 13th Int'l Symp on FPGA, Feb. 2005, p. 149-160, Monterey, CA.
C. Baru, et al. The SDSC Storage Resource Broker, in Procs. of CASCON'98, 1998, pp. 1-12, Toronto, Canada.

* cited by examiner

*Primary Examiner* — Frantz Coby
(74) *Attorney, Agent, or Firm* — Kenneth L. Sherman, Esq.; Michael Zarrabian, Esq.; Myers Andras Sherman & Zarrabian LLP

(57) ABSTRACT

The invention provides a method and system for managing data access. The method includes receiving a request for accessing a file, determining a type of the received request that corresponds to an access pattern based on history of many files, marking the request based on the type of request to identify the request as a candidate to be part of a sequential scan for accessing files in a sequential order, and processing the request based on the marking to throttle access of the file in the case of a potential ongoing erroneously requested sequential scan.

20 Claims, 4 Drawing Sheets

```
receive a request for accessing a file
add an entry into the history log
pass the request through the detection logic
if the request is marked as potentially caused by sequential scanning then
        if current statistics of marked requests does not indicate sequential scanning then
                process the request as normal
        else
                if number of outstanding marked requests reaches limit then
                        block the request until resources are available
                end if
                preserve the corresponding existing attribute values and back up new values
                if the request brings a data object from tape to disk then
                        add the consumed disk space to the total of all such files
                        if the sum reaches the threshold then
                                selected some files migrated to disk due to marked requests
                                migrate these files off to tape
                        end if
                end if
        end if
else
        if statistics of marked requests indicates sequential scanning then
                if the file was previous accessed by a marked request then
                        restore the file's saved attributes
                        if the file was brought in from tape then
                                subtract the file disk usage from the sum
                                exclude the file from the pool of files migrated due to marked
                                requests
                        end if
                end if
                determine whether end of the sequential scanning is reached
        else
                process the request as normal
        end if
end if
```

METHOD AND SYSTEM FOR MITIGATING IMPACT OF USER ERRORS IN DATA STORES

BACKGROUND OF THE INVENTION

1. Field of the Invention

The present invention relates generally to accessing stored data, and in particular to managing data access to mitigate errors.

2. Background Information

Many organizations are faced with the challenge of efficiently storing and properly managing rapidly growing volumes of electronic information, especially fixed-content data. Many of these organizations cannot afford to keep all data on hard disk drive systems. Such disk drive systems remain costly compared with other storage media such as tape, and consume power and floor space, contributing significantly to total Information Technology (IT) expense of organizations. In many IT environments, inactive data (seldom accessed but often retained over a long period of time), makes up the bulk of information stored. Such inactive data should be stored on lower cost storage, especially magnetic tape, lowering storage cost per bit of information. Tape systems are also appropriate for long term data retention, and conserve more energy than disk systems.

To improve the overall data storage cost effectiveness, many data stores often include mixture of storage subsystems with a wide range of different performance characteristics. Hierarchical Storage Management (HSM) systems allow data migration to proper locations in such data stores. An HSM system, typically implemented at the file system level, offers a transparent scheme for moving less active data to second tier storage devices, such as tape systems. The movement of data is typically governed by specific policies, such as simple rules based on typical file system attributes or more complicated metadata, such as file type, or even content based.

Despite the benefits of HSM systems, there remain a significant performance gap between different tiers of storage (particularly seek latency, in the case of disk vs. tape) in such systems. The overall responsiveness of the HMS systems can be significantly degraded when a large amount of data is migrated, impacting normal business operations. The transparency provided by HSM systems, a feature that is normally desirable, can become a contributing factor to such problems since often the system provides no easy means to determine what type of storage media a particular data object is stored on.

An example involves a file system which is backed up by tape libraries through HSM, exported to users through a network file system protocol, such as a Common Internet File System (CIFS). Assume one of the users just installed a new anti-virus software utility with default settings, which start a scan for all data automatically at midnight. If the user did not un-mount the HSM backed remote file system, the anti-virus software would flood the HSM system with requests for inactive data as it traverses through every directory and reads from each file. Besides causing unnecessary data traffic and wasting CPU cycles as well as network bandwidth, this might cause copying of inactive data from tape or migration into disk systems, occupying disk space (reducing disk space for more active data). This can also cause updates to certain object attributes such as time (access time), a parameter evaluated by many HSM systems in deciding which data should be migrated and when to migrate, and therefore send such scheme off track, causing the wrong set of data objects to be migrated. Furthermore, depending on the system implementation, and because of the fact that certain input/output (I/O) operations, such as tape related operations, can take a fair amount of time to complete, the requests can tie up all the working threads or processes in the system and effectively cause denial of services for legitimate requests.

SUMMARY OF THE INVENTION

The invention provides a method and system for managing data access. The method includes receiving a request for accessing a file, determining a type of the received request that corresponds to an access pattern based on access history of files, marking the request based on the type of request to identify the request as a candidate to be part of a sequential scan for accessing files in a sequential order, and processing the request based on the marking to throttle access of the file in the case of a potential ongoing erroneously requested sequential scan.

Another embodiment of the invention provides a system for managing data access. The system includes a file access device including: a request receiver module configured for receiving a file access request, a detection module configured for detecting a type of the file access request, a marking module configured for marking the file access request based on the type to identify the request as a candidate to be part of a sequential scan for accessing files in a sequential order, a statistics module configured for determining a probability that the file access request is part of a sequential scan, and a request processing module configured for processing the request based on the mark. A data storage system is connected to the file access device.

Yet another embodiment of the invention provides a computer program product for managing data access that causes a computer to receive a request for accessing a file, determine a type of request corresponding to an access pattern, mark the request based on the type of request to identify the request as a candidate to be part of a sequential scan for accessing files in a sequential order, and process the request based on the marking to throttle access of the file in the case of a potential ongoing erroneously requested sequential scan.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 3 illustrates pseudo code for a data access management embodiment of the invention.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of managing stored objects, as well as operation and/or component parts thereof. While the following description will be described in terms of reducing user error related to sequential scans, for clarity and to place the invention in context, it should be kept in mind that the teachings herein may have broad application to all types of systems, devices and applications.

The invention provides a method and system for managing data access. The method includes receiving a request for accessing a file, determining a type of the received request that corresponds to an access pattern based on access history of files, marking the request based on the type of request to identify the request as a candidate to be part of a sequential scan for accessing files in a sequential order, and processing the request based on the marking to throttle access of the file in the case of a potential ongoing erroneously requested sequential scan.

Figure 1:
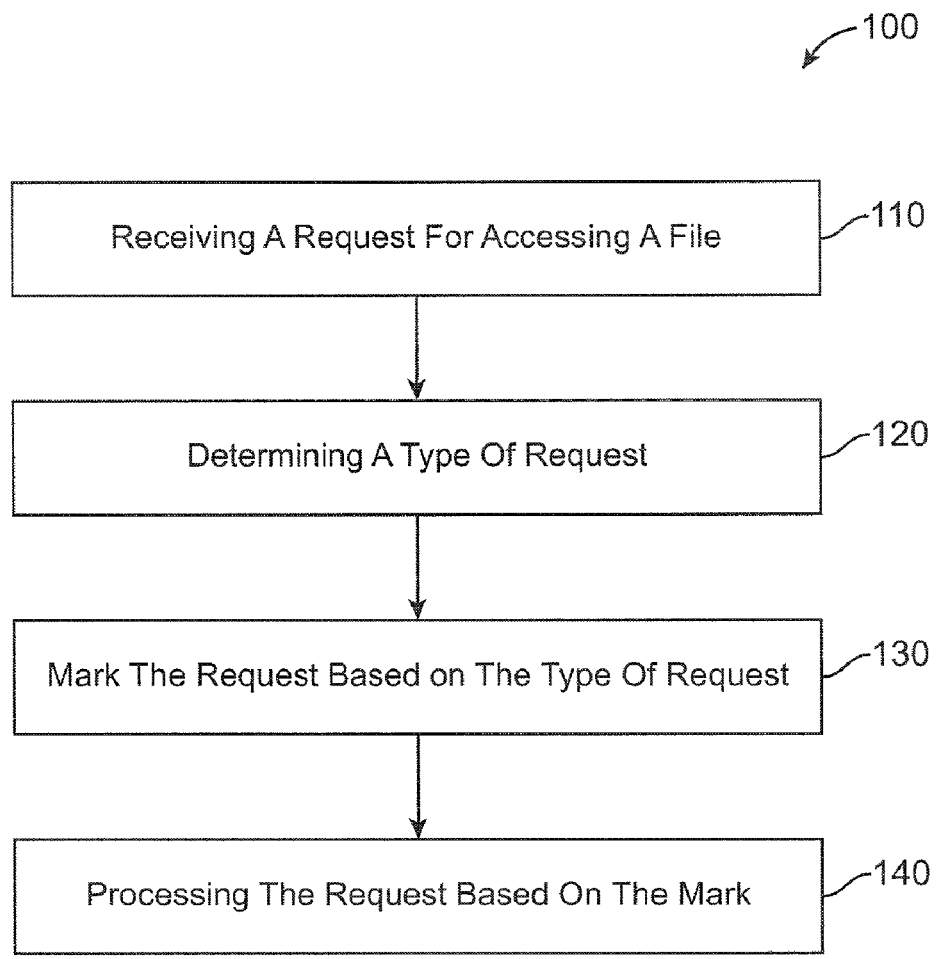
FIG. 1 illustrates a block diagram of a data access management process of one embodiment of the invention.

FIG. 1 illustrates a block diagram of a process 100 for managing data access to avoid erroneously requested sequential scans to avoid the overhead, delays and latencies associated with sequentially accessing files in a specific order based on past access history of all the files stored on a storage device according to one embodiment of the invention. Process 100 receives a request for accessing a data file in block 110. In block 120, the type of data access request corresponding to an access pattern is determined. In one embodiment of the invention, the type of user mistakes that are of concern (e.g., running a virus scanner, or running indexing utility against file systems backed up by HSM, running a script containing a script including "find /") manifest themselves through a similar data object access pattern. Such access pattern typically involves a form of sequential scanning of the complete namespace (or selected sub-trees belonging to it).

According to one embodiment of the invention, the pattern characteristics exhibited by requests caused by sequential scans are as follows. First pattern: Accesses are only read requests, and may request for all content of files or just partial content (e.g., just as headers). Second pattern: Each requested object file is only processed once during one invocation of a sequential scanning. Third pattern: Adjacent files are accessed together, i.e., files under one directory are accessed, and are accessed as files under other directories (in other embodiments of the invention it is possible that only a subset of all files under a directory is accessed, for example, the requested sequential scanning is directed to files with certain suffixes). Fourth pattern: Files and directories are accessed based on a specific order, for example the access is based on particular data object attributes (such as name, creation time, last access, last modification time, etc.), or simply the order that the system's directory lookup routine (e.g., getdents( ) on a UNIX system).

Detecting the first pattern is based on recognizing the type of access request (i.e., only read requests). To detect the second pattern, in one embodiment of the invention a history log of all the files that have been accessed is stored. Since the complete access history for an entire scan can take a significant amount of storage space, a history of a reasonable size is used as a good approximation for the complete access history. For example, a predetermined time period is used, such as several months, a year, etc. In one example, compression is used to reduce redundant information from the entries in the history log.

For efficient detection of files that have been accessed more than once, in another embodiment of the invention a hash table is stored where each entry represents an accessed file (hash collisions may be addressed through common techniques, such as overflow buckets). To prevent the size of the hash table becoming too large, certain entries may be removed. In one example, the entries that form a linked list are removed in the same order as they are inserted, when a threshold is reached. In another example, oldest entries are removed from the list when the threshold is reached, etc. In one implementation, the threshold is specified as a storage size limitation. In another implementation, the threshold is a percentage of total storage space available.

For detecting the third pattern, in one embodiment of the invention it is determined whether the current directory being accessed has already been stored in the history log. This does not rule out access sequences such as the following exemplar file directory requests [/a/b/c/f1, /a/b/c/f2, . . . /x/y/z/f1, /x/y/z/f2, . . . /a/b/d/f1, /a/b/d/f2], while according to the third pattern, files under /a/b/d directories are accessed before files under the /x/y/z directories, after the accessing of files under directory /a/b/c. The simplification used in this embodiment of the invention of determining whether the current directory being accessed has already been stored in the history log is a good approximation for determining if adjacent files are accessed together, and can be implemented using the methods described above for detecting the second pattern.

In one embodiment of the invention, detecting the fourth pattern can be a little more expensive in system delay, latency, higher cost of storage, etc. In one example, the files accessed are sorted under a particular directory based on a portion of attributes and then compared with the order in the history log. The comparison may be "greedy," to stop the sorting early on if a mismatch is found. If no such ordering is matched, the directory entries are retrieved by invoking the corresponding directory lookup interface and that order is compared with the access history. In one embodiment of the invention, it may not be necessary to detect the fourth pattern and this detection is optional.

In block 130, the request is marked based on the determined type of request. In one embodiment of the invention, the file access requests that are potentially part of a sequential scan are marked by setting a bit or flag in an access request instruction. In another embodiment of the invention, a field is set in a lookup table or database for the "marked" access request. For each request that matches the access patterns (e.g., first, second, third, fourth), the marking of the access request allows the marked access requests to be processed to determine whether the access request is a valid request or an erroneous request by a user.

To determine whether a sequential scanning is caused by possible user mistakes, in one embodiment of the invention, certain statistics (e.g., number of times the access request has been part of a sequential scan) are stored for marked requests in the history log (which can also be considered as a sliding window). For example, it can be determined that a sequential scanning is occurring if the number of marked requests exceeds a certain percentage (e.g., 90%) of the total number of requests in a current window. In one example, different threshold values are used for identifying the start and end of sequential scanning to avoid rapid flip-flops between different sequential access requests. In one implementation, the statistics are used to determine a probability that the marked request is part of a sequential scan based on the historical data for previous marked requests stored in the history log. It is determined if the probability exceeds a predetermined probability threshold to indicate that the marked request is part of a sequential scan. In another implementation, the determination is made based on the number of marked requests (or the amount of I/Os caused by these requests) in a fixed-length time window. Once possible user mistakes that are causing sequential scanning to occur are detected, the impacts of such requests are mitigated in block 140, as described below.

In block 140, the requests are processed based on the marked access requests. Sequential scanning can cause problems, such as: 1. Sequential scanning can migrate a large amount of inactive files into a disk system, as a result of which more active data might be migrated to slower storage media (e.g., tape storage); 2. Sequential scanning can change certain file attributes (e.g., last access time) for each file being scanned, which may negatively effect decision making in the data management; 3. High speed request ingestion caused by sequential scanning can build up a deep request queue at certain levels in a file system causing low bandwidth for other requests.

To mitigate the first problem, in one embodiment of the invention, the total amount of disk space that has been consumed by files brought into the disk system due to requests that are marked is kept track of. If the total amount of disk space reaches a certain threshold, some of these files are selected for migration out of the disk system (for example, in FIFO order).

To mitigate the second problem, in one embodiment of the invention, the attributes for files accessed by marked requests are not updated. In one embodiment of the invention a backup copy of the new attribute values for these objects are saved (e.g., as extended attributes of the objects or in separate tables) in a way that are not visible to normal data management operations. If at a later time users indicate that the detected sequential scanning is actually caused by valid operations (i.e., notify administrators through administrative interfaces), then these backup values can be used to restore the valid and updated attributes of those corresponding files correctly. In one implementation, such stored attribute values are automatically removed after certain time-out period (e.g., a week, a month, etc.). In another implementation, past attributes are stored for a file associated with an access request to replace updated attributes if the attributes of the file is caused by an access error.

To mitigate the third problem, in one embodiment of the invention the total number of outstanding requests that have been marked are limited to a threshold value that is lower than the maximum number of outstanding requests a system can support. The system bandwidth reserved for unmarked requests is determined by the gap between the threshold and the maximum. In one example, the threshold is an adjustable parameter that can be tuned based on the system workload. In one implementation, if it is determined that a file associated with a marked request is part of a sequential scan, it is then determined if the number of outstanding marked requests exceeds a threshold. If the number of outstanding requests exceeds the first threshold, then the access request is temporarily blocked.

In one embodiment, for a marked access request, the associated file is migrated from a first storage medium of a first cost, such as tape storage, to a higher cost second storage medium, such as a disk drive. The file size is added to a total size for stored files having marked requests. Said threshold may be set to a percentage based on: the total amount of storage available, a predetermined size amount, based on history, etc. When the total size exceeds a threshold, then the block 140 migrates a portion of the stored files having marked requests, to the first storage medium from the second storage medium to provide storage room on the second storage medium. If the access request is a valid request, when the total size for stored files having marked requests exceeds another threshold for total number of stored files that are marked, the file size is subtracted from the total size, and the file is excluded from a pool of files having marked requests that are migrated from the first storage medium to the second storage medium. It should be noted that in some embodiments of the invention where a disk drive is the second storage medium and a tape is the first storage medium, a migration from the tape to the disk (e.g., triggered by a marked read request) is typically performed by copying the data onto the disk, but the instance on the tape remians. Therefore, if the threshold is met, the copy on the disk can simply be discarded, i.e., there is no need to re-migrate the data back to the first storage device.

In one embodiment of the invention, process 100 can be disabled if a system administrator knows that a legitimate workload might cause sequential scanning and the resulted consequence is desirable. If the file associated with a marked request is not part of a sequential scan, the associated file is allowed access.

Figure 2:
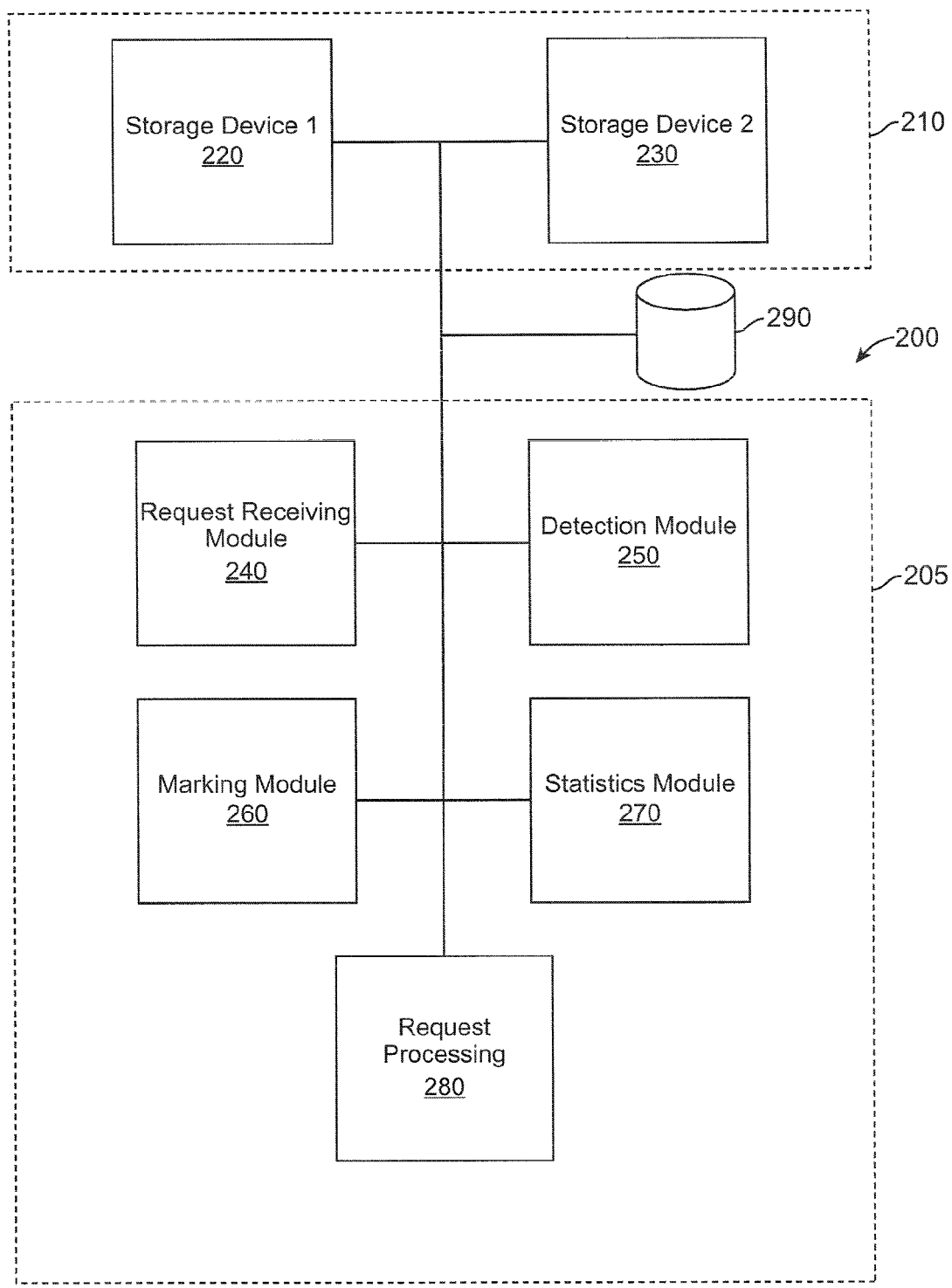
FIG. 2 illustrates a block diagram of a data access management system of an embodiment of the invention.

FIG. 2 illustrates an embodiment of a system 200 for managing data access by mitigating erroneous sequentially requested file accesses, according to an embodiment of the invention. The system includes a file access device 205 connected to a data storage system 210 (either wired or wirelessly). The file access device 205 includes a request receiver module 240 that is configured for receiving a file access request, a detection module 250 configured for detecting a type of the file access request, a marking module 260 configured for marking the file access request based on the type to identify the request as a candidate to be part of a sequential scan, a statistics module 270 configured for determining a probability that the file access request is part of a sequential scan; and a request processing module 280 configured for processing the request based on the mark. In one embodiment of the invention, file access device 205 includes functionality of process 205 in hardware components.

In one embodiment of the invention, data storage system 210 includes at least a first storage device 220 and a second storage device 230. In this embodiment of the invention, the first storage device 220 is slower and less costly than the second storage device 230. In this embodiment of the invention, the first storage device 220 is a tape based storage system and second storage device 230 is a disk type of storage system. In one embodiment of the invention, another storage device 290 is used to store data, such as access request historical logs, statistics of the access requests, and file attributes.

FIG. 3 illustrates pseudo-code for process 100 according to an embodiment of the invention for data access management to mitigate erroneous requested sequentially ordered file accesses.

Figure 4:
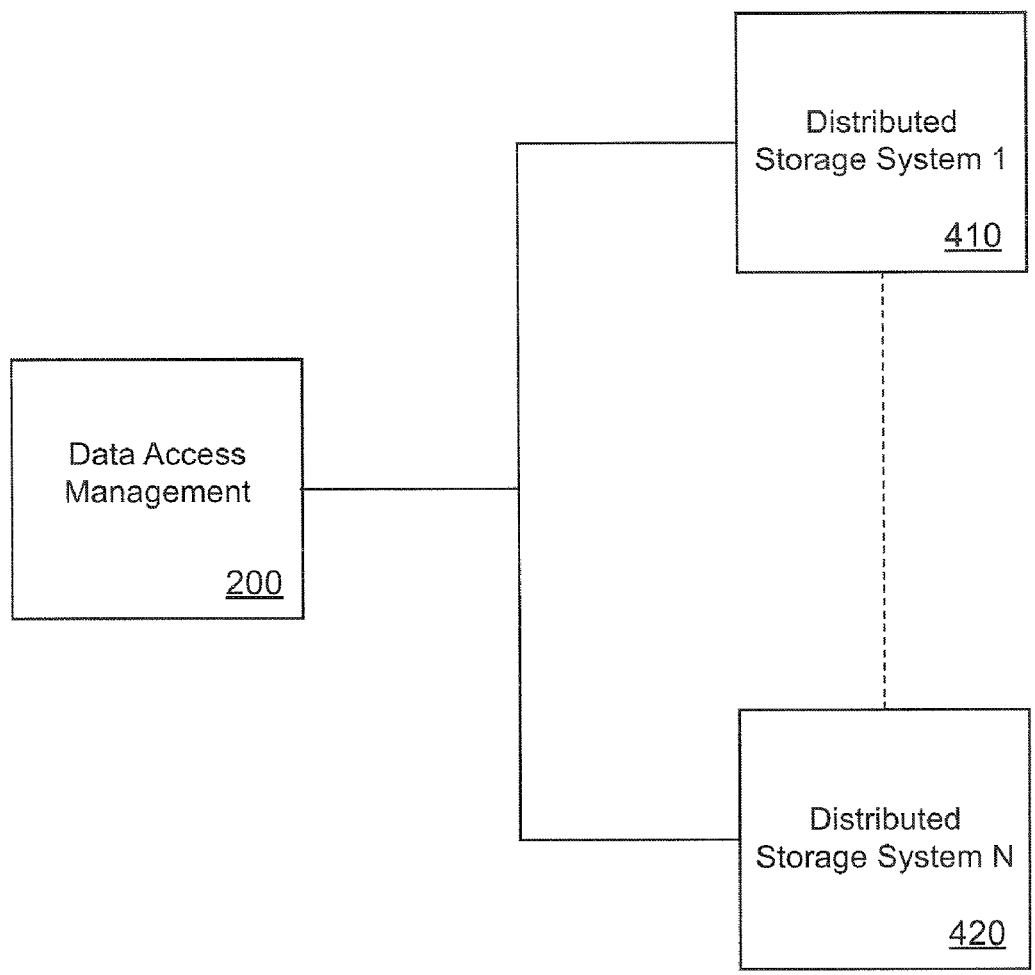
FIG. 4 illustrates a distributed network including a data access management system, according to an embodiment of the invention.

FIG. 4 illustrates an embodiment of the invention with data access management device 205 coupled to multiple distributed storage systems 420 (i.e., distributed storage system 1 through distributed storage system N). In this embodiment of the invention, data access management device 205 manages objects access requests for files stored in the distributed storage systems 420 over a network, such as a Local Area Network (LAN), Wide Area Network (WAN), Internet, etc. The distributed storage systems 420 communicate over the network either wirelessly or wired directly to the network. In one embodiment, only selected distributed storage systems are managed.

The embodiments of the invention satisfies the need for mitigating erroneously requested sequentially ordered file accesses (sequential scans), and presents a system, a computer program product and an associated method (collectively referred to as "the system" or "the present system") for detecting data requests that are likely to be caused by certain common user mistakes, and take appropriate actions to mitigate their impact so that a decent level of services can be provided to other requests. The embodiments can throttle (i.e., control file access by intelligently controlling file access request speed) based on system processing performance, available disk space, etc.

In some embodiments of the invention, accesses are not temporarily blocked or rejected even if the data requests are likely the results of user mistakes. Instead, these embodiments processes "suspicious" requests with certain restrictions to ensure that enough resources are reserved for other requests.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of managing data access, comprising:
receiving a request for accessing a file;
determining a type of the received request that corresponds to an access pattern type based on access history of a plurality of files, wherein the access pattern type comprises one or more of a first pattern comprising only read requests, a second pattern comprising objects only processed once during a sequential scanning operation, a third pattern comprising adjacent objects accessed together and a fourth pattern comprising objects accessed in a specified order;
marking the request based on the determined type of request to identify the request as a candidate to be part of a sequential scan for accessing files in a sequential order; and
processing the request based on the marking to throttle access of the file in the case of a potential ongoing erroneously requested sequential scan.

2. The method of claim 1, further comprising:
entering the data requests into a history log;
determining a probability from statistics that the marked request is part of a sequential scan based on historical data for data requests stored in the history log; and
determining if the probability exceeds a predetermined probability threshold to indicate that the marked request is part of a sequential scan.

3. The method of claim 2, further comprising:
in response to determining that the marked request is not part of a sequential scan, accessing the file.

4. The method of claim 2, further comprising:
in response to determining that the probability indicates that the marked request is part of a sequential scan, determining if a number of outstanding marked requests exceeds a first threshold; and
in response to determining that the number of outstanding requests exceeds the first threshold, throttling the request.

5. The method of claim 4, further comprising storing past attributes for the file that are updated by a marked request.

6. The method of claim 5, further comprising:
in response to the request, causing the file to migrate from a first storage medium to a second storage medium, adding a file size to a total size for files migrated due to marked requests; and in response to the total size exceeding a second threshold, migrating a portion of the stored files having marked requests to the first storage medium to provide storage room on the second storage medium, and subtracting their sizes from the total size.

7. The method of claim 6, further comprising:
in response to the file previously being accessed with a marked request, restoring the file with the past attributes if the request is confirmed to be caused by erroneous user action.

8. The method of claim 1, wherein the type of request is determined by matching different characteristics of data access patterns caused by sequential scanning.

9. The method of claim 1, wherein the request is marked by setting at least one bit in a file access request instruction.

10. A system for managing data access, comprising:
a file access device including:
 a request receiver module configured for receiving a file access request;
 a detection module configured for detecting a type of access request based on access pattern type, wherein the access pattern type comprises one or more of a first pattern comprising only read requests, a second pattern comprising objects only processed once during a sequential scanning operation, a third pattern comprising adjacent objects accessed together and a fourth pattern comprising objects accessed in a specified order;
 a marking module configured for marking the file access request based on the detected access type to identify the request as a candidate to be part of a sequential scan for accessing files in a sequential order;
 a statistics module configured for determining a probability that the file access request is part of a sequential scan;
 a request processing module configured for processing the request based on the mark; and
a data storage system coupled to the file access device.

11. The system of claim 10, wherein the request processing module is further configured for throttling the request in response to a number of outstanding marked requests exceeding a first threshold for a marked request having a determined probability that exceeds a predetermined probability threshold.

12. The system of claim 11, wherein the request processing module further is configured for accessing the file in response to determining that the marked request is not part of a sequential scan.

13. The system of claim 10, wherein the request processing module further is configured for adding a size amount of the file to a total size for stored files having marked requests for the request causing the file to migrate from a first storage medium in the storage system to a second storage medium in the storage system, and for migrating a portion of the stored files having marked requests to the first storage medium in response to determining the total size exceeds a second threshold.

14. A computer program product for managing data access comprising a computer usable medium including a computer readable program, wherein the computer readable program when executed on a computer causes the computer to:
receive a request for accessing a file;
determine a type of the received request that corresponds to an access pattern based on access history of a plurality of files, wherein the access pattern comprises one or more of a first pattern comprising only read requests, a second pattern comprising objects only processed once during a sequential scanning operation, a third pattern comprising adjacent objects accessed together and a fourth pattern comprising objects accessed in a specified order;
mark the request based on the determined type of request to identify the request as a candidate to be part of a sequential scan for accessing files in a sequential order; and
process the request based on the marking to throttle access of the file in the case of a potential ongoing erroneously requested sequential scan.

15. The computer program product of claim 14, wherein the computer readable program when executed on the computer further causes the computer to:
enter the data requests into a history log;
determine a probability from statistics that the marked request is part of a sequential scan based on historical data for data requests stored in the history log; and
determine if the probability exceeds a predetermined probability threshold to indicate that the marked request is part of a sequential scan.

16. The computer program product of claim 15, wherein the computer readable program when executed on the computer further causes the computer to:
in response to determining that the probability indicates that the marked request is part of a sequential scan, determine if a number of outstanding marked requests exceeds a first threshold; and
in response to determining that the number of outstanding requests exceeds the first threshold, throttle the request.

17. The computer program product of claim 16, wherein the computer readable program when executed on the computer further causes the computer to:
in response to the request, causing the file to migrate from a first storage medium to a second storage medium, add a file size to a total size for files migrated due to marked requests; and
in response to the total size exceeding a second threshold, migrate a portion of the stored files having marked requests to the first storage medium to provide storage room on the second storage medium, and subtracting their sizes from the total size.

18. The computer program product of claim 17, wherein the computer readable program when executed on the computer further causes the computer to:
in response to the file previously being accessed with a marked request, restore the file with the past attributes if the request is confirmed to be caused by erroneous user action if the request is confirmed to be caused by erroneous user action.

19. The computer program product of claim 14, wherein the type of request is determined by characteristics of data access patterns caused by sequential scanning patterns.

20. The computer program product of claim 14, the computer readable program when executed on the computer further causes the computer to:
store past attributes for the file that are updated by a marked request.

* * * * *